US008155350B2

(12) United States Patent
Suyama et al.

(10) Patent No.: US 8,155,350 B2
(45) Date of Patent: Apr. 10, 2012

(54) AMPLIFIER CONTROLLER

(75) Inventors: Akio Suyama, Hamamatsu (JP); Takaaki Muto, Hamamatsu (JP); Naohide Kohyama, Hamamatsu (JP); Ken Iwayama, Paris (FR)

(73) Assignee: Yamaha Corporation, Hamamatsu-shi (JP)

( * ) Notice: Subject to any disclaimer, the term of this patent is extended or adjusted under 35 U.S.C. 154(b) by 382 days.

(21) Appl. No.: 12/401,423

(22) Filed: Mar. 10, 2009

(65) Prior Publication Data

US 2009/0232331 A1 Sep. 17, 2009

(30) Foreign Application Priority Data

Mar. 11, 2008 (JP) ................................ 2008-060875

(51) Int. Cl.
*H04B 1/00* (2006.01)

(52) U.S. Cl. ...................................................... 381/119

(58) Field of Classification Search .................. 381/119
See application file for complete search history.

(56) References Cited

U.S. PATENT DOCUMENTS

2003/0059067 A1* 3/2003 Shibata ........................ 381/119

OTHER PUBLICATIONS

Yamaha Network Amp Manager Owner's Manual, M.D.G., Pro Audio Digital Musical Instrument Division, Yamaha Corporation, 2003.

* cited by examiner

*Primary Examiner* — Steven J Fulk
(74) *Attorney, Agent, or Firm* — Morrison & Foerster LLP

(57) ABSTRACT

An amplifier controller for controlling a plurality of amplifiers connected therewith is provided. Each of said amplifiers is provided with one or more audio output channels. The amplifier controller operates in two modes of solo mode and normal mode. When the solo mode is initiated, the amplifier controller instructs all of the amplifiers to turn off output of all audio output channels provided in the amplifiers, and only in the solo mode, according to selection of an output channel for which solo output is to be performed, the amplifier controller instructs the amplifier provided with the selected channel to turn on output of the channel, and instructs each of the amplifiers provided with an audio output channel other than the selected channel to turn off output of the audio output channel.

5 Claims, 5 Drawing Sheets

AMPLIFIER CONTROLLER

BACKGROUND OF THE INVENTION

1. Field of the Invention

The invention relates to an amplifier controller which communicates with a plurality of amplifiers respectively including a unit that controls on/off of an output in each of output channels and controls the plurality of amplifiers, an amplifier system in which the amplifier controller and the amplifiers to be controlled are provided, and amplifier control method for controlling the amplifiers by the amplifier controller.

2. Description of the Related Art

Conventionally, there has been known an amplifier control system such that a PC is used as an amplifier controller, and the PC is connected to a number of amplifiers via a network, and thereby, a number of the amplifiers can be controlled and managed in a centralized manner by the PC.

In an environment where a number of speakers are used, such as a concert hall and a theater, a number of amplifiers are used accordingly, and if the amplifiers can be controlled by a PC in a centralized manner, a user can set operations of each of the amplifiers without access to the place where the amplifiers are located, resulting that a setting work can be performed effectively.

For example, it makes it possible to turn a mute on/off in each of the amplifiers only by operating the PC.

Such an amplifier control system is disclosed in, for example, "Network Amp Manager Operation Manual" by YAMAHA Corporation.

SUMMARY OF THE INVENTION

Incidentally, in the case when speakers are used in a concert hall and a theater, it is common to perform an output inspection of the speakers before a performance. In this case, the output inspection is performed so that the output of only the speaker that a user desires to inspect is turned on, and the outputs of the other speakers are turned off.

However, there has not been provided a function suitable for the above operation in the conventional amplifier control system.

Herein, for example, when the user operates the above-described mute function of the amplifiers connected to the speakers appropriately, the user can mute the outputs of all of the speakers except the single speaker, and thereby, the state where the output of only the single speaker is turned on can be realized.

However, the mute function is a function provided to turn off the output of the specific speaker, therefore, there has been a problem that the operation of the function becomes difficult to perform instinctively in the case when the function is used to turn on the output of only the specific speaker.

For example, in the case when the inspection of the single speaker is completed, and then the inspection of the next speaker is to be performed, it becomes necessary to perform an operation such that a mute of the speaker of which the output has been on until then (the mute has been turned off) is turned on, and then, a mute of the speaker that is to be inspected next is turned off. The operation is instinctively difficult to perform, and it also takes time in terms of a work selecting the speaker to let sound output.

Further, in the case when the state of the speaker is shifted to the state where a performance is conducted after the inspection, the user must perform somewhat confusing mute cancellation operation taking into consideration for which speakers the mute should be remained on, accordingly, there is some risk of setting errors from this viewpoint.

It is an object of the invention to solve the problem and realize easier output inspection of the speakers connected to the amplifiers in the case when a number of the amplifiers are controlled in a centralized manner by an amplifier controller.

To attain the above object, an amplifier controller of the invention is an amplifier controller for controlling a plurality of amplifiers connected therewith, wherein each of the amplifiers being provided with one or more audio output channels, the amplifier controller including: a mode controller that decides initiation and termination of solo mode; a solo initiating device that, when the mode controller decides to initiate the solo mode, instructs all of the plurality of the amplifiers to turn off output of all audio output channels provided in the amplifiers; a selector that selects an audio output channel for which solo output is to be performed; a solo instructing device that instructs the amplifier provided with the audio output channel selected by the selector to turn on output of the selected channel, and instructs each of the amplifiers provided with an audio output channel other than the selected channel to turn off output of the audio output channel; and a controller that activates the solo instructing device only in the solo mode.

In such an amplifier controller, preferably included is a solo terminating device that, when said mode controller decides to terminate the solo mode, instructs all of said plurality of the amplifiers to turn on output of all audio output channels provided in the amplifiers.

The invention also provides an amplifier control method corresponding to the above amplifier controller.

The invention also provides an amplifier system including a plurality of amplifiers respectively provided with one or more audio output channels and an amplifier controller corresponding to the above. In such an amplifier system, each of the amplifiers includes a switching device that turns on and turns off output of said one or more audio output channels according to instruction by the amplifier controller.

Further, in the amplifier system, it is preferable that each of the amplifiers include no means for turning on and turning off the output of the one or more audio output channels according to manual operation performed onto the amplifier itself.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, the best mode for carrying out the invention will be concretely described based on the drawings.

Figure 1:
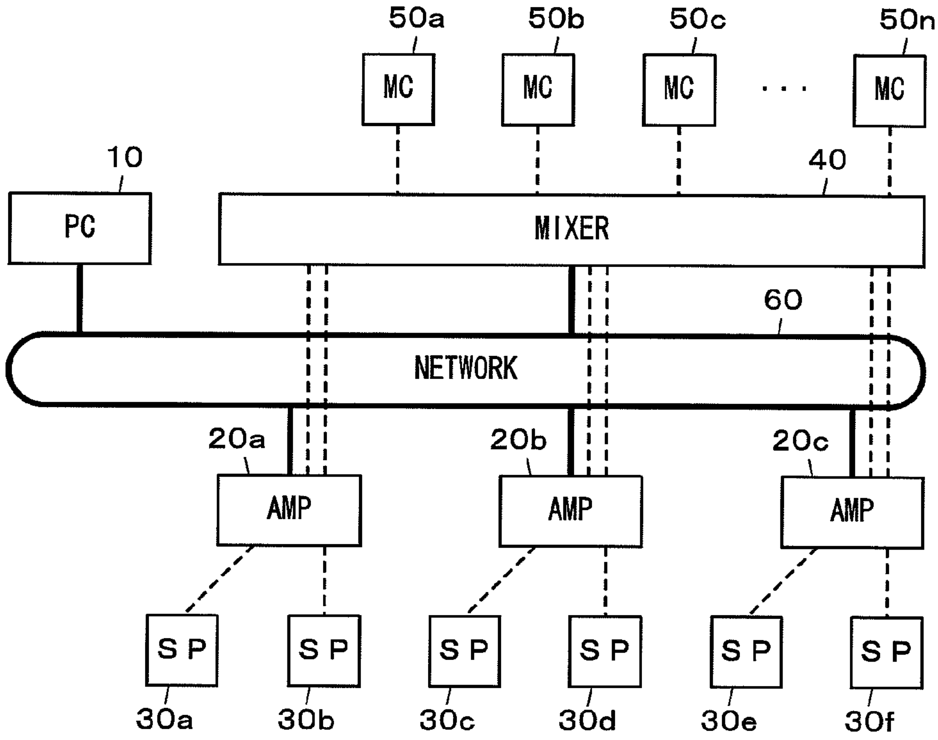
FIG. 1 is a block diagram showing a constitution of an amplifier system including a PC which is an embodiment of an amplifier controller of the invention.

First, FIG. 1 shows a constitution of an amplifier system including a PC which is an embodiment of an amplifier controller of the invention.

As shown in FIG. 1, a PC 10, amplifiers (AMPs) 20*a* to 20*c*, speakers (SPs) 30*a* to 30*f*, a mixer 40, microphones (MCs) 50*a* to 50*n* are provided in the amplifier system. Then, the PC 10, the amplifiers 20*a* to 20*c*, and the mixer 40 are connected to a network 60 in an Ethernet (registered trademark) format, which are able to communicate mutually.

Further, the microphones 50*a* to 50*n*, the mixer 40, the amplifiers 20*a* to 20*c*, and the speakers 30*a* to 30*f* are connected by audio cables shown by dotted lines in the drawing, and audio data can be transmitted from top to bottom in the drawing.

These respective devices establish an audio signal processing system in which audio signals obtained by collecting with the microphones 50*a* to 50*n* are mixed in the mixer 40, the mixed output audio signals are amplified in the amplifiers 20*a* to 20*c*, and the amplified output signals are supplied to the speakers 30*a* to 30*f* for sound generation based on the signals.

Herein, the PC 10 is the amplifier controller controlling the amplifiers 20*a* to 20*c*, and by transmitting/receiving control data such as various commands to/from the amplifiers 20*a* to 20*c* via the network 60, the PC 10 can edit parameter values used for processing of the audio signals in the amplifiers 20*a* to 20*c*, perform various settings for the amplifiers 20*a* to 20*c*, and so on.

Further, the PC 10 also functions as a mixer controller controlling the mixer 40, and can edit parameter values and perform various settings for the mixer 40.

In the amplifier system shown in FIG. 1, the devices of the PC 10 and the amplifiers 20*a* to 20*c* are related to the characteristic of the embodiment. Well-known devices can be used as the other devices to constitute the system.

Note that in the following explanation, numerals to which alphabets are not added, such as "20" will be used in the case when the device such as the amplifier is indicated without specifying any individual devices.

Figure 2:
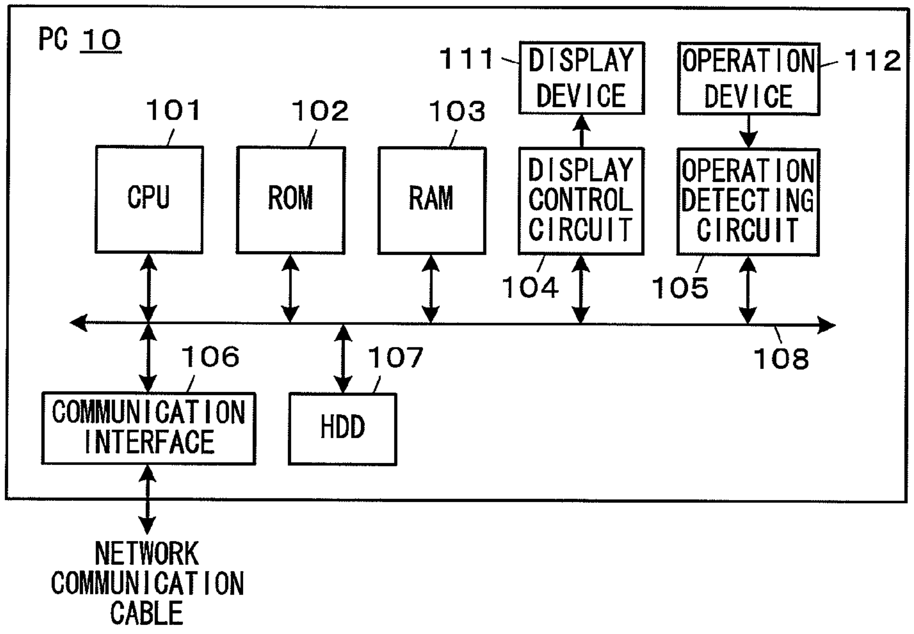
FIG. 2 shows a hardware configuration of the PC shown in FIG. 1.

Next, FIG. 2 shows a hardware configuration of the PC 10 shown in FIG. 1.

PC 10 can be configured as a well-known PC regarding hardware. For example, it is configured such that a CPU 101, a ROM 102, a RAM 103, a display control circuit 104, an operation detecting circuit 105, a communication interface (I/F) 106, and a HDD (a hard disc drive) 107 are provided in the PC 10, and these are connected via a system bus 108.

The CPU 101 executes appropriate programs stored in the ROM 102 and the HDD 107, and thereby, the functions as the above-described amplifier controller and mixer controller can be realized.

Further, the display control circuit 104 is a circuit to control display on a display device 111 such as a display, and the operation detecting circuit 105 is a circuit to detect operation performed on an operation device 112 such as a keyboard or a mouse.

The PC 10 can present information to a user and further accept user's operations by the above circuits. Note any external devices may be utilized as the display device 111 and the operation device 112 as a matter of course.

The communication I/F 106 is an interface to be connected to the network 60 shown in FIG. 1 to communicate with the external devices such as the amplifiers 20 and the mixer 40.

Figure 3:
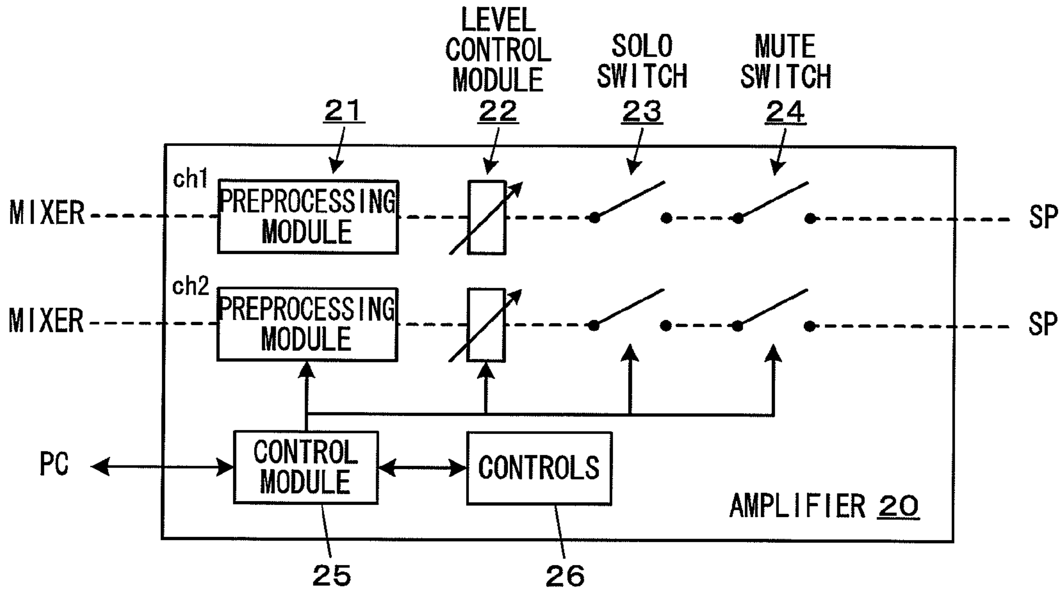
FIG. 3 is a view showing a functional configuration of an amplifier shown in FIG. 1.

Next, FIG. 3 shows a functional configuration of the amplifier 20. The functions with respect to handling of the audio signals are only shown in the drawing.

As shown in FIG. 3, the amplifier 20 can process the audio signals in two channels. The amplifier 20 performs processing on the input audio signals of two systems in each of preprocessing modules 21, level control modules 22, solo switches 23, and mute switches 24, and then outputs the processed signals as high-power analog audio signals suitable for driving the speakers.

Among the above, the preprocessing module 21 is a signal processing module to perform processing such as phase adjustment and attenuation on the input audio signal. The level control module 22 is a signal processing module to perform level adjustment on the input audio signal.

Both of the solo switch 23 and the mute switch 24 are signal processing modules to function as switches for switching whether or not to output the signal. However, uses and control methods thereof are different significantly. The mute switch 24 is a switch utilized when the amplifier 20 is normally used (for example, during performance), for selecting on/off of sound output. On the other hand, the solo switch 23 is a switch utilized when the amplifier 20 is inspected, for enabling sound output only to a desired speaker. The embodiment is focused on control of the solo switches 23 from the PC 10.

Further, in the amplifier 20, a control module 25 can control the operations in the above-described modules based on the control data received from the PC 10. That is, the control module 25 sets parameter values for processing in the preprocessing modules 21 and the level control modules 22 and turns on/off the solo switches 23 and the mute switches 24 based on the control data received from the PC 10.

Further, there is provided controls 26 such as buttons or sliders in the amplifier 20 in order to set parameters for the preprocessing modules 21 and the level control modules 22 and turn on/off the mute switches 24. The control module 25 sets the parameter values and turns on/off the mute switches 24 according also to operation performed on the controls 26.

However, there are not provided controls in the amplifier 20 in order to turn on/off the solo switches 23, and the control module 25 does not turn on/off the solo switches 23 according to any direct manual operation on the amplifier 20. Herein, turning on/off the solo switches 23 is performed only in the case when the control module 25 receives the control data instructing to turn on/off the solo switches 23 from the PC 10 (and at the time when the amplifier 20 starts up). However, it is also possible to provide controls in order to turn on/off the solo switches 23.

Figure 4:
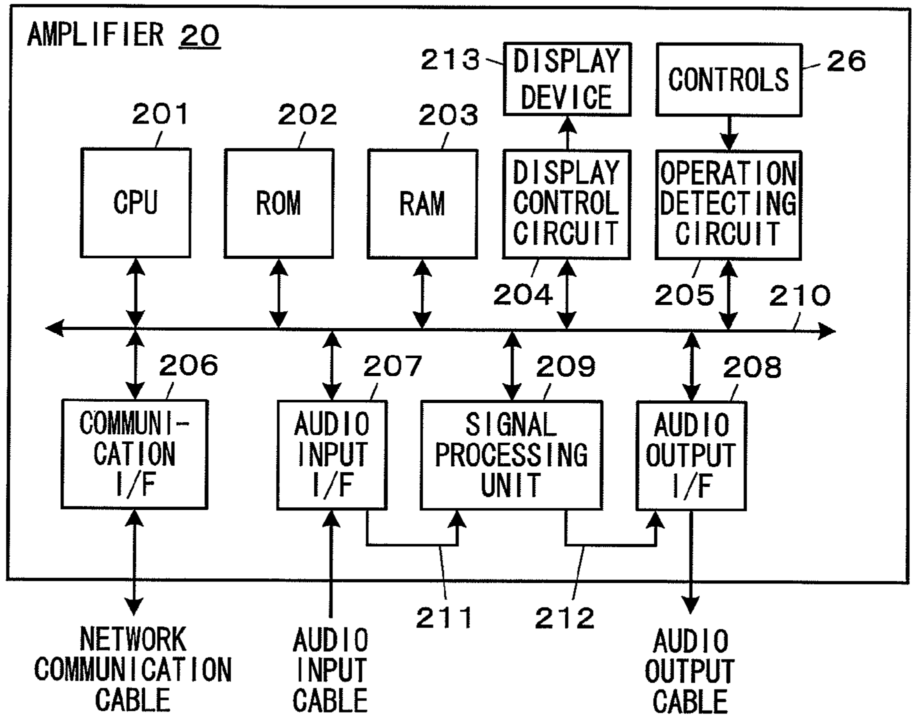
FIG. 4 is a view showing a hardware configuration of the amplifier shown in FIG. 1.

Next, FIG. 4 shows a hardware configuration of the amplifier 20 shown in FIG. 1.

As shown in FIG. 4, a CPU 201, a ROM 202, a RAM 203, a display control circuit 204, an operation detecting circuit 205, a communication I/F 206, an audio input I/F 207, an audio output I/F 208, and a signal processing unit 209 are provided in the amplifier 20, and these are connected via a system bus 210. Further, the audio input I/F 207, the audio output I/F 208, and the signal processing unit 209 are connected also by audio signal lines 211 and 212.

The CPU 201 executes an appropriate program stored in the ROM 202, and thereby controls transmission/reception of data and the audio signals via the respective I/Fs 206 to 208, signal processing by the signal processing unit 209, display on a display device 213 (via the display control circuit 204), detection at the controls 26 (via the operation detecting circuit 205), and the like.

The communication I/F 206 is an interface to be connected to the network 60 shown in FIG. 1 to communicate with the external devices such as the PC 10.

The audio input I/F 207 and the audio output I/F 208 are interfaces to input or output the audio signals via the cables being connected thereto. Note that the audio signal to be inputted may be digital audio waveform data or an analog signal, but the signal to be outputted is the high-level analog audio signal as descried above.

Then, the audio signal inputted from the audio input I/F 207 is supplied to the signal processing unit 209 via the audio signal line 211, and after being processed in the signal processing unit 209, the audio signal is supplied to the audio output I/F 208 via the audio signal line 212 to be outputted. The function of the signal processing unit 209 is as shown in FIG. 3.

Figure 5:
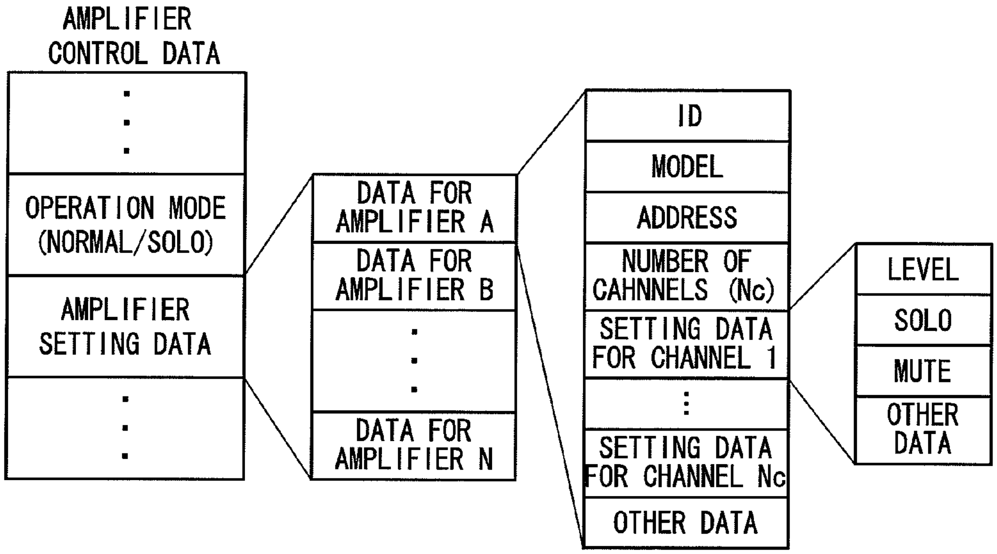
FIG. 5 is a view showing structure of data used by the PC shown in FIG. 1 to control the amplifier.

Next, FIG. 5 shows structure of data used by the PC 10 to control the amplifier 20.

Amplifier control data shown in the drawing is data that is stored in the RAM 103 in the PC 10 when being used, and it is also possible that the amplifier control data is stored in a memory such as the HDD 107 and read from the memory into the RAM 103 in accordance with a user's instruction when being used for controlling the amplifier 20.

The amplifier control data includes data defining an operation mode which indicates how the PC 10 controls the amplifier 20, and amplifier setting data being data with respect to each of the amplifiers 20.

As for the operation mode, provided are a normal mode, which is a mode for a normal operation and in which the function of the solo switch 23 is inactivated, and a solo mode, which is a mode for an output inspection of the speaker 30 and in which the function of the solo switch 23 is activated.

The amplifier setting data includes an amplifier ID, a device model, an address used for communication, a channel number Nc indicating the number of signal processing channels, setting data for each of the channels, and other data with respect to each of the amplifiers 20 to be controlled by the PC 10. Further, the setting data for each of the channels includes setting values of signal level used in the level control modules 22 shown in FIG. 3, solo flags indicating on/off of the solo switches 23, and mute flags indicating on/off of the mute switches 24. The parameter values used in the pre-processing modules 21 are included in "other data".

The data as above can be modified by the CPU 101 automatically or in accordance with the user's operation. When the data is modified, the control data is transmitted on necessary to the amplifier 20 and setting is performed according to the parameter values after the modification.

Since the operation mode and the solo flag are significantly related to the characteristic of the embodiment in the data as above, hereinafter, the operation mode and the solo flag will be mainly explained.

Figure 6:
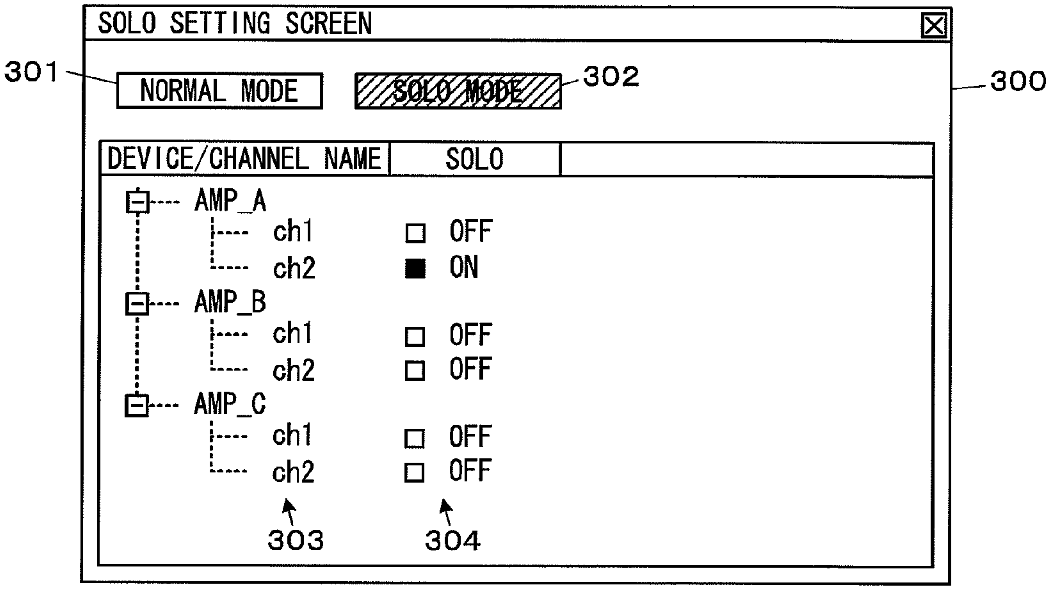
FIG. 6 is a view showing an example of a screen to accept a setting with respect to an operation of a solo switch.

Next, FIG. 6 shows an example of a screen to accept settings with respect to the operation of the solo switch 23.

A solo setting screen 300 shown in FIG. 6 is a GUI (graphical user interface) displayed on the display device 111 of the PC 10, and a screen to accept the setting with respect to the operation of the solo switch 23.

A normal mode button 301, a solo mode button 302, a channel list display part 303, and a solo setting part 304 are provided on the solo setting screen 300.

Among the above, the normal mode button 301 and the solo mode button 302 are buttons to select the above-described normal mode or solo mode alternatively. There is shown a state where the solo mode is selected in the drawing.

The channel list display part 303 is an area for displaying a list in which output channels provided in the amplifier are indicated with respect to each of the amplifiers 20 to be controlled by the PC 10. Note that information of the speakers 30 connected to the audio output I/F 208 may be displayed on the solo setting screen 300.

The solo setting part 304 is an area for accepting a setting of whether a solo output is "on" or "off" regarding each channel displayed in the channel list display part 303. By clicking a box on the left the user can instruct to turn on the solo output in the corresponding channel. The setting made here is registered in an item referred to as "solo" of the setting data for the corresponding channels shown in FIG. 5. When the content of the setting data for any of the channels is updated, the CPU 101 updates the display of the solo setting screen 300, and instructs the amplifier 20 to change the operation accordingly (in other words, transmits appropriate control data to the amplifier 20).

Herein, the maximum number of channels for which the solo output can be set at "on" simultaneously is limited to only one. Accordingly, when the CPU 101 detects an instruction to turn on the solo output in one of the channels, the CPU 101 automatically turns off the solo output in the channel in which the solo output is set at "on" at that time. Further, when the box of corresponding to the channel in which the solo output is set at "on" is clicked, the CPU 101 inverts the setting, resulting that the solo output is set at "off".

The function of the solo setting part 304 is active only in the solo mode, and the CPU 101 prohibits the operation of the solo setting part 304 in the normal mode. Further, in the normal mode, the CPU 101 causes the amplifier 20 to turn off all of the solo switches 23 without referring the solo flags, thereby substantially inactivating the solo function.

Hereinafter, processing executed by the CPU 101 of the PC 10 for controlling operation of the solo switch 23 is explained.

Figure 7:
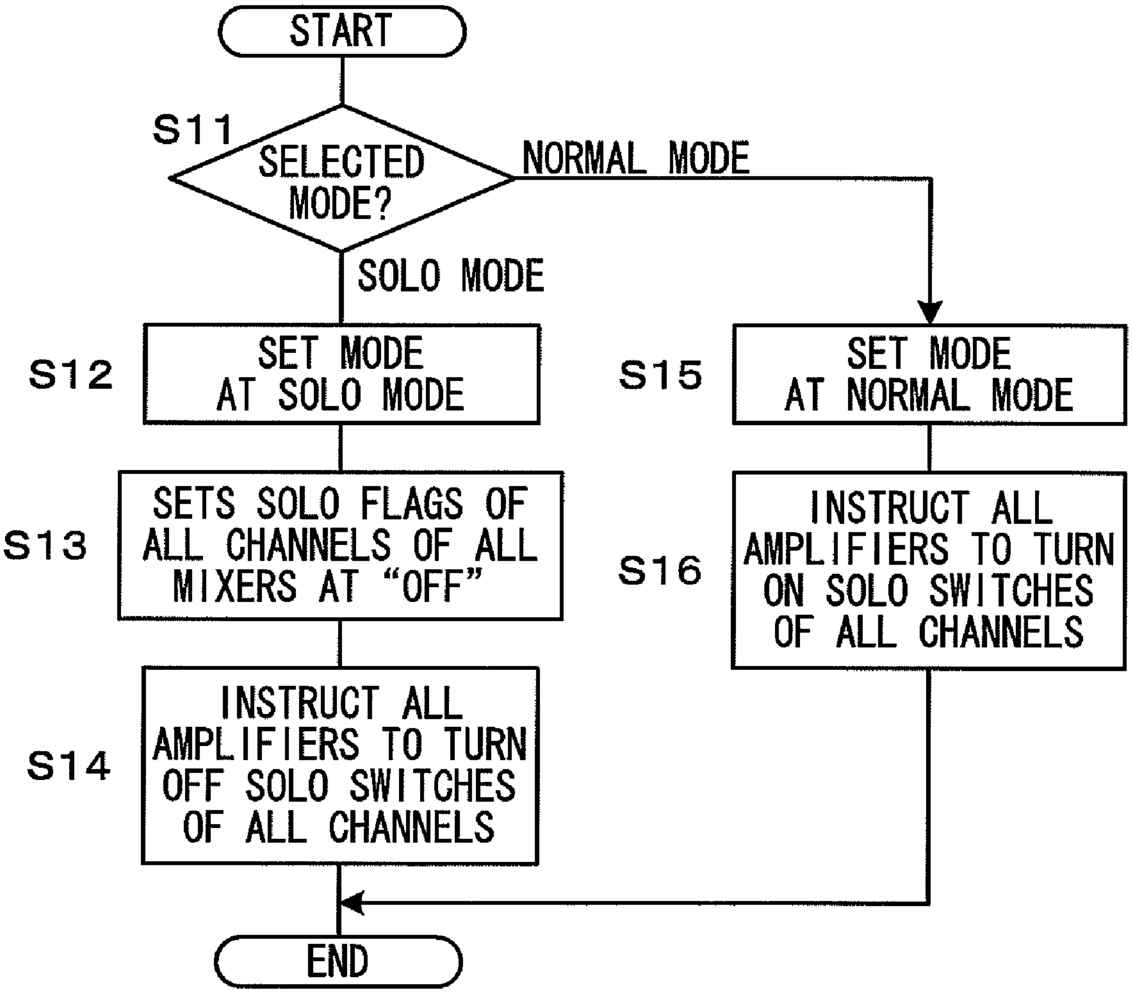
FIG. 7 is a flowchart of processing executed when a mode selection operation is performed.

Firstly, FIG. 7 shows a flowchart of the processing executed when a mode selection operation is performed.

The CPU 101 of the PC 10 starts the processing shown in FIG. 7 when detecting the mode selection operation through the normal mode button 301 or the solo mode button 302 on the solo setting screen 300 shown in FIG. 6.

In the case when the selected mode is the solo mode (S11), the CPU 101 sets the mode of itself at the solo mode to initiate the operation in the solo mode (S12), and sets the solo flags of all channels of all of the amplifiers 20 to "off" (S13). These settings are performed on the amplifier control data shown in FIG. 5.

Thereafter, the CPU 101 instructs all of the amplifiers 20 to turn off the solo switches 23 of all channels (S14), and ends the processing. The instruction corresponds to the setting change performed at Step S13. The respective amplifiers 20 turn off the solo switches 23 of all channels in accordance with the instruction given at Step S14.

On the other hand, in the case when the selected mode is the normal mode (S11), the CPU 101 sets the mode of itself at the normal mode to initiate the operation in the normal mode, that is, to terminate the operation in the solo mode (S15). This setting is also performed on the amplifier control data shown in FIG. 5. Note that, because the content of the solo flag is not referred in the normal mode, it is not necessary to change the value of thereof.

Thereafter, the CPU 101 instructs all of the amplifiers 20 to turn on the solo switches 23 of all channels (S16), and ends the processing. The respective amplifiers 20 turn on the solo switches 23 of all channels in accordance with the instruction given at Step S16.

Through the above-described processing, the solo switches 23 in the amplifiers 20 can be set at the state suitable for initiating control in the selected mode in response to the mode selection operation. That is, since the solo function is inactivated in the normal mode, all of the switches are turned on so that the solo switches 23 do not affect the output when the normal mode is initiated. On the other hand, when the solo mode is initiated, all of the solo switches are once turned off so that the solo switch of only the channel selected by the user can be then turned on.

Figure 8:
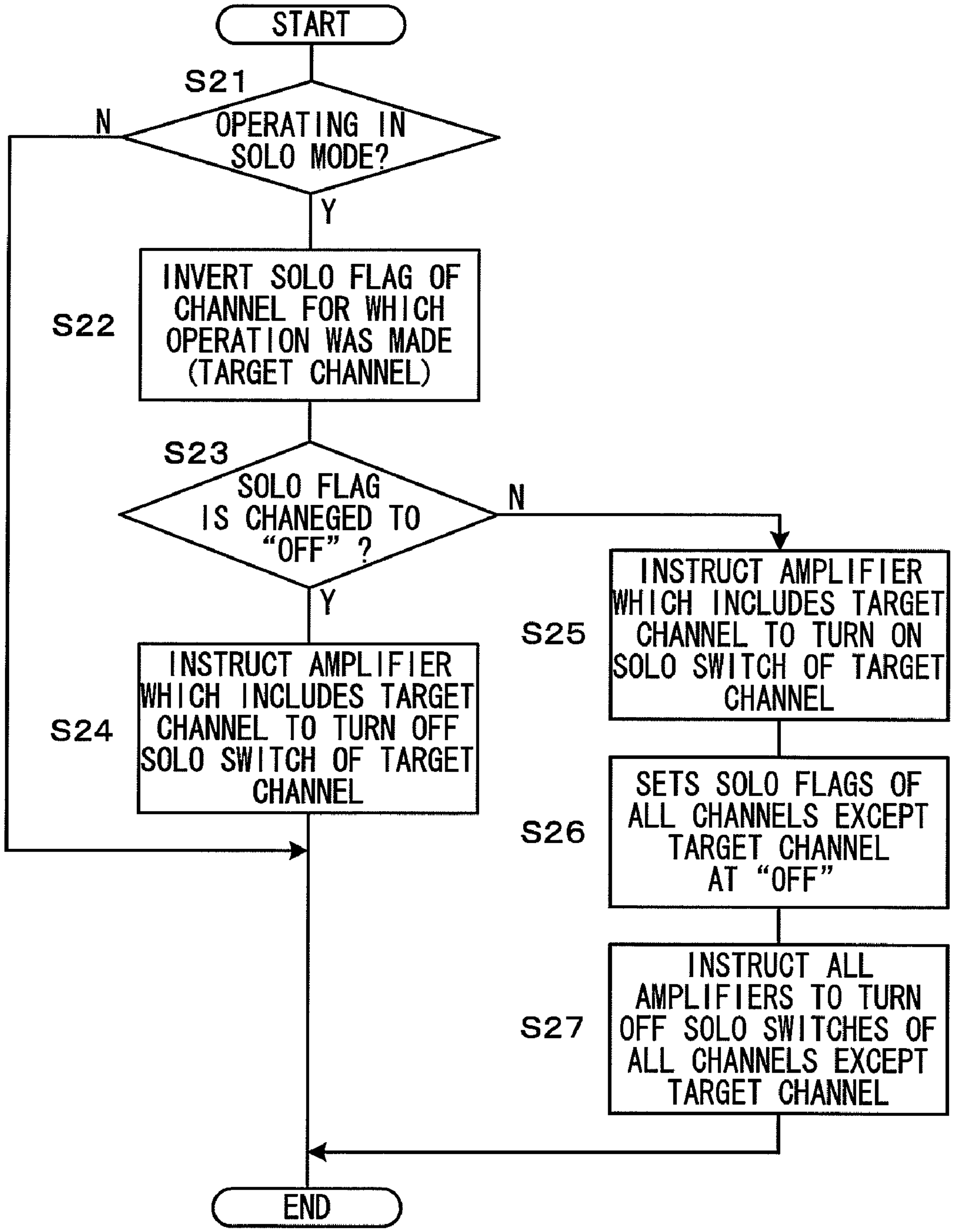
FIG. 8 is a flowchart of processing executed when the solo setting part shown in FIG. 6 is operated.

Next, FIG. 8 shows a flowchart of the processing executed when the solo setting part shown in FIG. 6 is operated.

The CPU 101 of the PC 10 starts the processing shown in the flowchart in FIG. 8 when detecting that one of the boxes in the solo setting part 304 is clicked on the solo setting screen 300 shown in FIG. 6.

In the case when the CPU 101 operates in the solo mode (S21), the CPU 101 inverts the solo flag of the channel for which the operation was made (hereinafter this channel is described as "a target channel") (S22). In the case when the solo flag is changed to "off" by the inversion (S23), the CPU 101 instructs the amplifier 20 which includes the target channel to turn off the solo switch 23 of the target channel in accordance with the change of the solo flag (S24), and ends the processing. To which amplifier the CPU 101 instructs can be determined based on the amplifier control data shown in FIG. 5. Further, the amplifier 20 which receives the instruction given at Step S24 turns off the solo switch 23 of the channel according to the instruction.

The above steps are executed in the case when the box of the channel for which the solo flag (and solo switch 23) has already been set at "on" is clicked, and in this case, as a result of the processing at Step S24, all of the solo switches 23 come to "off" state.

Further, in the case when the solo flag is changed to be "on" at Step S23, the CPU 101 instructs the amplifier 20 including the target channel to turn on the solo switch 23 of the target channel in accordance with the change of the solo flag (S25). Then, the CPU 101 sets the solo flags of all of the channels except the target channel at "off" in order to set the solo switches 23 which have been set at "on" until then, at "off" (S26), instructs all amplifiers 20 to turn off the solo switches 23 of all of the channels except the target channel (S27), and ends the processing. The respective amplifiers 20 switch the solo switch 23 of respective channels to an appropriate state in accordance with the instructions given at Steps S24 and S27.

Further, in the case when the CPU 101 does not operate in the solo mode (the own device operates in the normal mode) at Step S21, the operation at the solo setting part 304 is inactive, and accordingly, the CPU 101 ends the processing directly.

In the processing as above, the instruction is not needed for an amplifier which does not include channels other than the target channel at Step S27, and it is acceptable that only the solo flag set at "on" and solo switch 23 of the channel for which the solo flag was set at "on" before the operation is turned off at Steps S26 and S27.

Through the above-described processing, the solo switches 23 in the amplifiers 20 can be set appropriately according to the operation at the solo setting part 304. The operation to set the output of only the selected channel to be "on" and the outputs of the other channels to be "off" can be performed by clicking once. Accordingly, the setting operation in order to perform the output inspection for the speakers connected to the amplifiers one by one can be performed easily. In the case when a number of the amplifiers 20 are controlled in a centralized manner, the output inspection by turning on/off the output with a mute function needs complicated operation, and causes some risk of erroneous operation. Accordingly, the above-described solo function is particularly effective in such a case.

In the above case, turning on/off the solo switch 23 does not affect the setting contents of other portions used in the normal mode at all. Thus, in the solo mode, the user can perform the output inspection in the state where the setting content for the normal mode is completely reflected. Further, the setting contents except that of the solo switch 23 can be changed similarly by an operation on a not-shown screen in the normal mode and the solo mode, and accordingly, in the solo mode, the user can perform the output inspection while adjusting values of parameters such as the level and listening to sound output from the speaker 30 in which the adjustment is reflected.

Further, since the solo switches 23 are fixed at "on" in the normal mode, the erroneous operation of the solo switches 23 can be prevented after the inspection ends and the operation mode is switched to the normal mode. By not providing any controls for switching the solo switch 23 in the amplifier 20, it is possible to effectively prevent the risk that the solo switch 23 is turned off by the erroneous operation. It is considered that the output inspection is normally performed while operating each of the amplifiers 20 from the PC 10 for the centralized control. Accordingly, inconvenience may not particularly arise from such a structure.

The explanation of the embodiment comes to an end, and it is of course that the constitutions of the system and the device, the constitution of the screen, the structure of the data, concrete processing contents, operation methods, and so on are not limited to those explained in the above-described embodiment.

For example, in the above-described embodiment, the maximum number of channels for which the solo output can be set at "on" simultaneously is limited to only one, but the limit may be removed. This modification can be achieved by omitting processing at Steps S26 and S27 in FIG. 8. The modification enables to inspect the outputs of the plural speakers simultaneously.

Further, in the above-described embodiment, the network 60 and the audio cables are provided respectively. However, among the devices connected to the network 60, the audio waveform data may be transferred via the network 60. In the example shown in FIG. 1, such transfer can be adopted among the mixer 40 and each of the amplifiers 20.

Furthermore, in the above-described embodiment, an input and an output are corresponding to each other in one-to-one relation, such a structure is not essential. For example, even in the case in which a single input is branched to be outputted from a plurality of terminals, the solo switch 23 is provided in each output channel, and turning on/off of each of the solo switches 23 can be controlled by the PC 10, the effect similar to that of the above-described embodiment can be obtained. In the case in which a plurality of inputs are mixed to be outputted from a single terminal, the effect similar to that of the above-described embodiment can be obtained as well.

The number of channels in the single amplifier 20 is not limited to two as a matter of course.

Further, the program to make a computer function as the amplifier controller and realize the above-described functions, and the program is stored in a ROM, an HDD, and so on beforehand. In addition, the program may be recorded in a non-volatile recording medium (memory) such as a CD-ROM or a flexible disc to be provided, and then the program is read from the memory to a RAM, so that a CPU executes the program. The program may be also downloaded from an external device including a recording medium where the program is recorded or an external device including a storage unit such as the HDD where the program is stored, and then, the program is executed by the CPU. In either case, the similar effect can be obtained.

Further, the constitutions and the modifications described above are applicable in any combination within a consistent range.

As is clear from the above explanation, according to the amplifier controller, amplifier control method or the amplifier system of the invention as above, in the case when a number of the amplifiers are controlled in a centralized manner from the amplifier controller, the output inspection of the speakers connected to the amplifiers can be performed easily.

Accordingly, by adopting the invention, the amplifier system having a good operability can be obtained.

What is claimed is:

1. An amplifier controller for controlling a plurality of amplifiers connected therewith, wherein each of said amplifiers being provided with one or more audio output channels, said amplifier controller comprising:

a mode controller that decides initiation and termination of solo mode;

a solo initiating device that, when said mode controller decides to initiate the solo mode, instructs all of said plurality of the amplifiers to turn off output of all audio output channels provided in the amplifiers;

a selector that selects an audio output channel for which solo output is to be performed;

a solo instructing device that instructs the amplifier provided with the audio output channel selected by said selector to turn on output of the selected channel, and instructs each of the amplifiers provided with an audio output channel other than the selected channel to turn off output of the audio output channel; and a controller that activates said solo instructing device only in the solo mode.

2. An amplifier controller according to claim 1, further comprising a solo terminating device that, when said mode controller decides to terminate the solo mode, instructs all of said plurality of the amplifiers to turn on output of all audio output channels provided in the amplifiers.

3. An amplifier control method for controlling a plurality of amplifiers, each of said amplifiers being provided with one or more audio output channels, said method comprising following steps performed by an amplifier controller to which said plurality of amplifiers are connected:

a mode control step of deciding initiation and termination of solo mode;

a solo initiating step of, when initiation of the solo mode is decided in said mode control step, instructing all of said plurality of the amplifiers to turn off output of all audio output channels provided in the amplifiers;

a selecting step of selecting an audio output channel for which solo output is to be performed; and a solo instructing step of instructing the amplifier provided with the audio output channel selected by said selector to turn on output of the selected channel, and instructing each of the amplifiers provided with an audio output channel other than the selected channel to turn off output of the audio output channel, wherein said amplifier controller performs said solo instructing step only in the solo mode.

4. An amplifier system comprising: a plurality of amplifiers respectively provided with one or more audio output channels; and an amplifier controller for controlling said plurality of amplifiers connected therewith, wherein said amplifier controller comprising:

a mode controller that decides initiation and termination of solo mode;

a solo initiating device that, when said mode controller decides to initiate the solo mode, instructs all of said plurality of the amplifiers to turn off output of all audio output channels provided in the amplifiers;

a selector that selects an audio output channel for which solo output is to be performed;

a solo instructing device that instructs the amplifier provided with the audio output channel selected by said selector to turn on output of the selected channel, and instructs each of the amplifiers provided with an audio output channel other than the selected channel to turn off output of the audio output channel; and a controller that activates said solo instructing device only in the solo mode, and each of said amplifiers comprising a switching device that turns on and turns off output of said one or more audio output channels according to instruction by said amplifier controller.

5. An amplifier system according to claim 4, wherein each of said amplifiers comprising no means for turning on and turning off the output of said one or more audio output channels according to manual operation performed onto the amplifier itself.

* * * * *